(12) United States Patent
Ohwa et al.

(10) Patent No.: US 8,229,941 B2
(45) Date of Patent: Jul. 24, 2012

(54) INFORMATION PROCESSING APPARATUS, INFORMATION PROCESSING METHOD, AND PROGRAM THEREFOR

(75) Inventors: Tsunayuki Ohwa, Kanagawa (JP); Satoshi Akagawa, Tokyo (JP)

(73) Assignee: Sony Corporation (JP)

( * ) Notice: Subject to any disclaimer, the term of this patent is extended or adjusted under 35 U.S.C. 154(b) by 282 days.

(21) Appl. No.: 12/316,126

(22) Filed: Dec. 9, 2008

(65) Prior Publication Data
US 2009/0240688 A1 Sep. 24, 2009

(30) Foreign Application Priority Data

Dec. 11, 2007 (JP) ................. P2007-319211

(51) Int. Cl.
 G06F 7/00 (2006.01)
 G06F 17/30 (2006.01)
(52) U.S. Cl. ........................................ 707/758
(58) Field of Classification Search .................. 707/758
See application file for complete search history.

(56) References Cited

U.S. PATENT DOCUMENTS

| | | | |
|---|---|---|---|
| 5,796,428 A | 8/1998 | Matsumoto et al. | |
| 5,918,223 A * | 6/1999 | Blum et al. | 1/1 |
| 7,127,454 B2 * | 10/2006 | Deguchi | 1/1 |
| 7,739,597 B2 * | 6/2010 | Wong et al. | 715/721 |
| 2005/0211077 A1 | 9/2005 | Kobayashi | |
| 2006/0056796 A1 | 3/2006 | Nishizawa et al. | |
| 2006/0192880 A1 * | 8/2006 | Takahira et al. | 348/333.05 |

FOREIGN PATENT DOCUMENTS

| | | |
|---|---|---|
| JP | 07-123307 A | 5/1995 |
| JP | 2005204021 A | 7/2005 |
| JP | 2005-275068 A | 10/2005 |
| JP | 2006-086622 A | 3/2006 |
| JP | 2007-005985 A | 1/2007 |
| JP | 2007-200424 A | 8/2007 |

OTHER PUBLICATIONS

Office Action from Japanese Application No. 2009-289815, dated Jan. 24, 2012.

* cited by examiner

*Primary Examiner* — Greta Robinson
*Assistant Examiner* — Jeffrey Chang
(74) *Attorney, Agent, or Firm* — Lerner, David, Littenberg, Krumholz & Mentlik, LLP

(57) ABSTRACT

An information processing apparatus displays image data and plays back music data such that background music (BGM) is applied to a collection of content such as photographic data, the BGM being reminiscent of the time when the photographic data was acquired. When a command to display a scrapbook or similar plurality of image data is issued, a search unit searches for music metadata that is related to the image metadata of the image data. A display controller then controls the display of the specified plurality of image data, while in parallel, a playback controller controls the playback of the music data corresponding to the music metadata found by the search unit.

9 Claims, 5 Drawing Sheets

FIG. 3

| ID | SHOOTING DATE/TIME | COMMENT | FOCAL LENGTH | ... |
|---|---|---|---|---|
| P1 | 15 AUGUST 11:15 | AT THE BEACH | ... | ... |

FIG. 4

| ID | TITLE | MOOD | PERIOD | PHOTO ID |
|---|---|---|---|---|
| S1 | IZU TRIP | FUN | 15-17 AUGUST | P1, P2, ... |

FIG. 5

| ID | TITLE | ARTIST | RELEASE DATE | PLAYBACK HISTORY | MOOD |
|---|---|---|---|---|---|
| M1 | ABC | AAA | 08/01/2006 | 08/17/2006 14:25 | FUN |

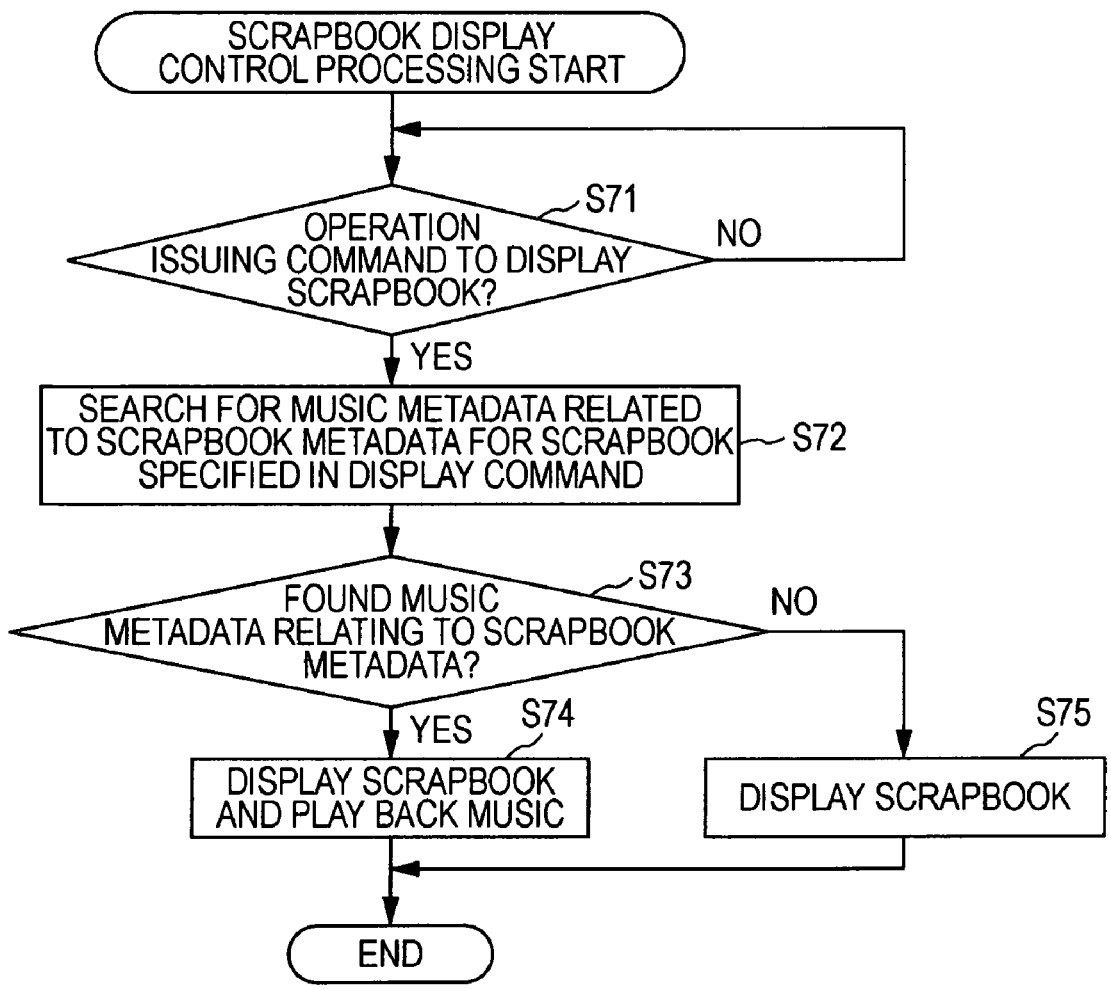

INFORMATION PROCESSING APPARATUS, INFORMATION PROCESSING METHOD, AND PROGRAM THEREFOR

CROSS REFERENCES TO RELATED APPLICATIONS

The present application claims priority from Japanese Patent Application No. JP 2007-319211, filed in the Japanese Patent Office on Dec. 11, 2007, the entire content of which is incorporated herein by reference.

BACKGROUND OF THE INVENTION

1. Field of the Invention

The present invention relates to an information processing apparatus, an information processing method, and a program therefor. More particularly, the present invention relates to an information processing apparatus, an information processing method, and a program able to, for example, apply background music (BGM) to a collection of content such as photographic data, wherein the BGM is reminiscent of the time at which the photographic data was acquired.

2. Description of the Related Art

As an example, in a digital camera, digital image data (to be hereinafter referred to as photo data where appropriate) obtained by imaging a subject is recorded together with metadata that includes information such as a date and time indicating when the photo data was acquired.

In addition, as digital cameras have become more prevalent, a variety of management applications for managing photo data on a computer are now being distributed (and/or sold). Using such management applications, photo data is separated into groups. For example, photo data may be grouped on the basis of the shooting date and time included in the metadata, wherein a plurality of photo data having identical year, month, and day values for the shooting date is grouped into a single group.

Meanwhile, users typically organize photographs acquired by a silver salt camera (i.e., a camera using silver halide-containing film) by first separating the photographs according to criteria such as the shooting date and time, shooting location, and by event. A user may then organize the photographs by arranging the photographs acquired on the same date, at the same location, or at a single event on a single page or on a plurality of sequential pages in an album.

Similarly, there exist management applications for managing photo data by using an electronic album (hereinafter, also referred to as a scrapbook) that imitates the function of an album for organizing physical photographs.

When organizing photo data using a scrapbook, metadata appended to the photo data is first read, and photo data having appended metadata that is similar or identical is then collected and arranged on the respective pages of a scrapbook. In other words, a collection of photo data that was acquired on the same date, at the same location, or at a single event is arranged on the respective pages of a scrapbook.

By thus viewing a scrapbook having arranged therein a collection of photo data sorted according to similar or identical metadata, the user is able to enjoy viewing related photo data, and is also able to discover previously unnoticed relationships existing among the photo data.

Meanwhile, Japanese Patent Application JP 2006-86622 discloses a proposed information processing apparatus that functions as follows. When the user selects a photo album storing still images to be displayed, and then subsequently selects background music (BGM) for playback, the information processing apparatus displays the still images processed with effects associated with the mood of the one or more songs being played as BGM.

SUMMARY OF THE INVENTION

The technique for applying BGM to a scrapbook may involve the user selecting one or more songs related to the collection of photo data arranged on the respective pages of the scrapbook, or the apparatus selecting one or more songs at random.

However, a technique has not yet been proposed for automatically applying one or more songs to a scrapbook, wherein the one or more songs are related to the collections of photo data arranged on the respective pages of the scrapbook.

The present invention, being devised in light of the foregoing circumstances, is able to apply BGM to a collection of content such as photo data, wherein the BGM is reminiscent of the time at which the photo data was acquired.

An information processing apparatus in accordance with a first embodiment of the present invention displays image data and plays back music data, and includes: searching means for searching for music metadata (being the metadata of the music data) that is related to image metadata (being the metadata of a plurality of image data), such searching being conducted when a command to display a plurality of image data is issued; display control means for controlling the display of the plurality of image data specified for display; and playback control means for controlling the playback of the music data corresponding to the music metadata found by the searching means, the playback being controlled in parallel with the display of the plurality of image data by the display control means.

The music metadata may be configured to include a playback history indicating when the music data was played back by a music playback apparatus. The searching means may then be configured to search for music metadata containing a playback history chronologically close to the shooting date and time contained in the image metadata that indicates the time at which the plurality of image data was acquired by an imaging apparatus.

The information processing apparatus may further include importing means for importing the playback history in the music metadata from the music playback apparatus.

The music metadata may also be configured to include the release date of the music data. The searching means may then be configured to search for music metadata containing a release date that is chronologically close to the shooting date and time contained in the image metadata that indicates the time at which the plurality of image data was acquired by an imaging apparatus.

The information processing apparatus may further include: classifying means for analyzing the characteristics of the music data and then classifying the music data into given categories; and association information storing means for storing category association information that associates image metadata with one or more categories. The music metadata may also be configured to include the category association information. The searching means may then be configured to search for music metadata containing category association information that is associated with the image metadata.

The information processing apparatus may further include input means for inputting a mood for a plurality of image data as one value contained in the image metadata, wherein the mood value is input according to operations by the user. The association information storing means may then be configured to store category association information expressing the mood of the music data, while the searching means may be configured to search for music metadata containing category association information expressing a mood that is similar or identical to the mood of the plurality of image data.

An information processing method in accordance with another embodiment of the present invention is a method implemented by an information processing apparatus that displays image data and plays back music data. The method includes the steps of: searching for music metadata (being the metadata of the music data) that is related to image metadata (being the metadata of a plurality of image data), such searching being conducted when a command to display a plurality of image data is issued; controlling the display of the plurality of image data specified for display; and controlling the playback of the music data corresponding to the music metadata found in the searching step, the playback being controlled in parallel with the display of the plurality of image data in the display control step.

A program in accordance with another embodiment of the present invention causes a computer to function as an information processing apparatus that displays image data and plays back music data, the program causing the computer to function as: searching means for searching for music metadata (being the metadata of the music data) that is related to image metadata (being the metadata of a plurality of image data), such searching being conducted when a command to display a plurality of image data is issued; display control means for controlling the display of the plurality of image data specified for display; and playback control means for controlling the playback of the music data corresponding to the music metadata found by the searching means, the playback being controlled in parallel with the display of the plurality of image data by the display control means.

In an embodiment of the present invention, when a command to display a plurality of image data is issued, a search is conducted for music metadata (being the metadata of music data) that is related to the image metadata (being the metadata of the plurality of image data). A control is then conducted to display the plurality of image data specified by the display command, while another control is conducted to play back the music data corresponding to the music metadata found by search, such that the playback is conducted in parallel with the display of the plurality of image data.

According to an embodiment of the present invention, BGM is applied to a collection of content such as photo data, wherein the BGM is reminiscent of the time at which the photographic data was acquired.

BRIEF DESCRIPTION OF THE DRAWINGS

FIG. 3 shows an example of arranged photo metadata;

FIG. 4 shows an example of primary metadata;

FIG. 5 shows an example of music metadata;

FIG. 8 is a flowchart explaining scrapbook display control processing.

DESCRIPTION OF THE PREFERRED EMBODIMENTS

Hereinafter, embodiments of the present invention will be described with reference to the accompanying drawings.

Figure 1:
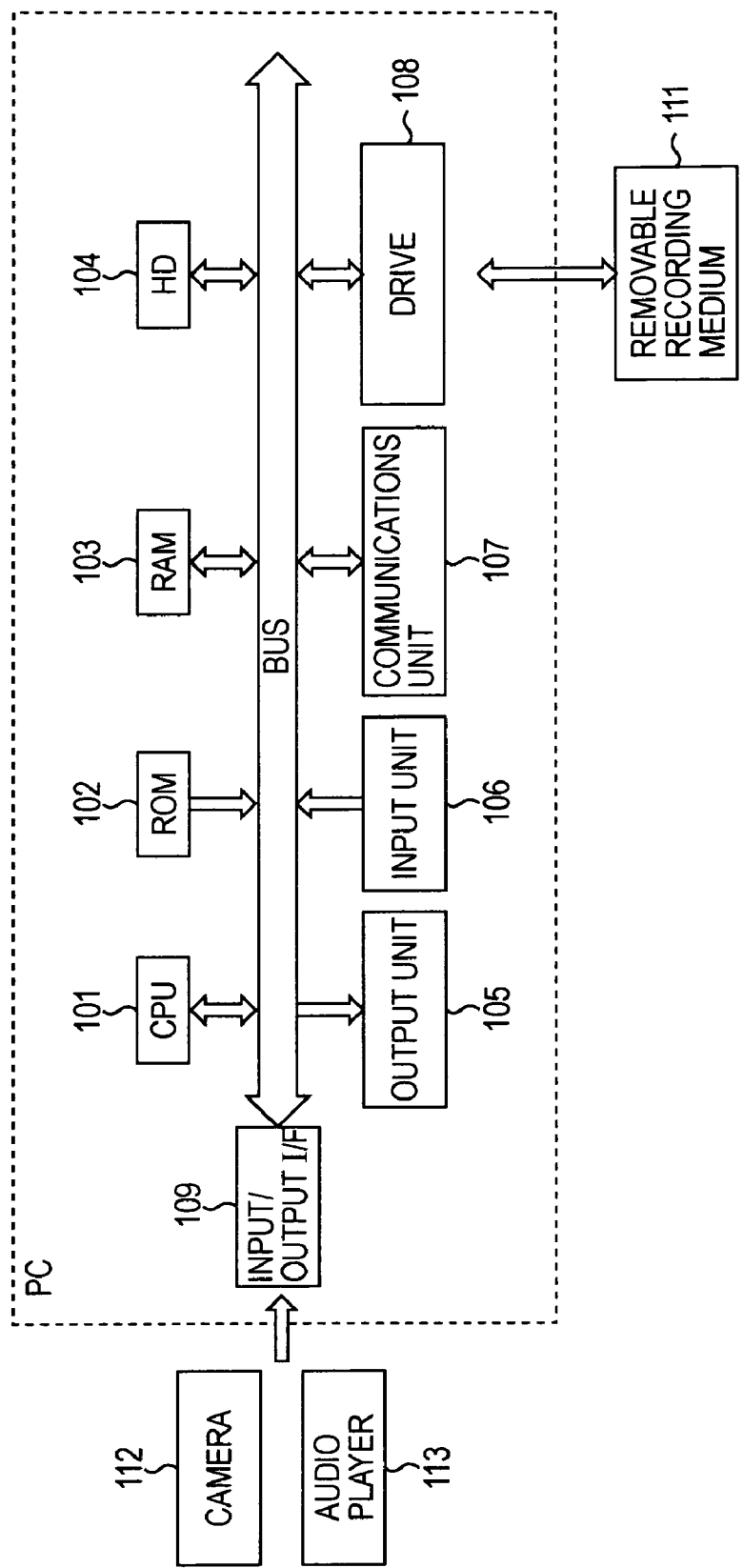
FIG. 1 is a block diagram illustrating an exemplary configuration of an embodiment wherein the present invention has been applied to a PC.

FIG. 1 is a block diagram illustrating an exemplary configuration of an embodiment wherein the present invention has been applied to a personal computer (PC) that functions as an information processing apparatus.

In FIG. 1, the PC is configured to include a central processing unit (CPU) 101, read-only memory (ROM) 102, random access memory (RAM) 103, a hard disk (HD) 104, an output unit 105, an input unit 106, a communications unit 107, a drive 108, and an input/output interface (I/F) 109, the above being mutually connected via a bus. Data and other information is exchanged via the bus among the respective components 101 to 109.

The CPU 101 controls the respective functional blocks constituting the PC by executing programs stored in ROM 102 and the RAM 103. In addition, the CPU 101 executes suitable processing that causes the PC to function as a scrapbook apparatus that organizes content such as photo data with the use of a scrapbook (i.e., an electronic album).

The ROM 102 stores information such as programs to be executed by the CPU 101.

The RAM 103 temporarily stores programs to be executed by the CPU 101, as well as data used during the operation of the CPU 101.

The HD 104 stores programs to be executed by the CPU 101, as well as data used during the operation of the CPU 101.

The output unit 105 includes components such as a liquid crystal display (LCD) and one or more speakers, for example, and functions to display images and output audio.

The input unit 106 includes components such as a keyboard, mouse, and microphone, and is operated by the user in order to issue commands to the PC, for example.

The communications unit 107 is an interface for communicating with a network such as a local area network (LAN) or the Internet, for example. The communications unit 107 exchanges information such as data (i.e., communicates) with the network as appropriate.

The drive 108 is configured such that a removable recording medium 111 can be removably loaded thereinto. The removable recording medium 111 may be a flexible disk, a CD-ROM (Compact Disc Read-Only Memory), an MO (magneto-optical) disk, a DVD (Digital Versatile Disc), a magnetic disk, or semiconductor memory, for example. The drive 108 drives the removable recording medium 111 loaded thereinto to record information such as data supplied from the bus onto the removable recording medium 111, or alternatively, to read information such as data from the removable recording medium 111 and then output such information to the bus.

The input/output I/F 109 is an interface for exchanging information such as data with external equipment. The specific communications interface adopted as the input/output I/F 109 may be a wired communications interface such as USB (Universal Serial Bus) or IEEE 1394 (Institute of Electrical and Electronics Engineers 1394), or a wireless communications interface such as Bluetooth®.

In the PC configured as described above, the user may connect external equipment to the input/output I/F 109. For example, the user may connect a digital still camera, a digital video camera, or similar camera 112 to the input/output I/F 109. The PC configured as described above is then able to take photo data (herein existing as image data acquired by the camera 112) from the camera 112 and import the photo data to the HD 104 (i.e., cause the photo data to be stored in the HD 104) via the input/output I/F 109.

Similarly, the user may also connect other external equipment to the input/output I/F 109. For example, the user may connect a portable audio player, a car audio device, or similar audio player 113 to the input/output I/F 109. The PC configured as described above is then able to take music data stored in the audio player 113 and import the music data to the HD 104 (i.e., cause the music data to be stored in the HD 104) via the input/output I/F 109.

In addition, in the PC shown in FIG. 1, an application program for causing the PC to function as a scrapbook apparatus (i.e., a scrapbook program) is installed on the HD 104. The CPU 101 reads the scrapbook program from the HD 104, and then loads and executes the scrapbook program in the RAM 103. In so doing, the PC functions as a scrapbook apparatus that organizes content such as photo data stored in the HD 104 with the use of a scrapbook.

The program executed by the PC (more specifically, by the CPU 101 therein) may be installed in advance on the PC (more specifically, on the HD 104 therein), as described above. However, the program may also be stored on the removable recording medium 111 and installed on the PC from the removable recording medium 111. Alternatively, the program may be downloaded from an Internet download site or similar provider via the communications unit 107 and subsequently installed on the PC.

Figure 2:
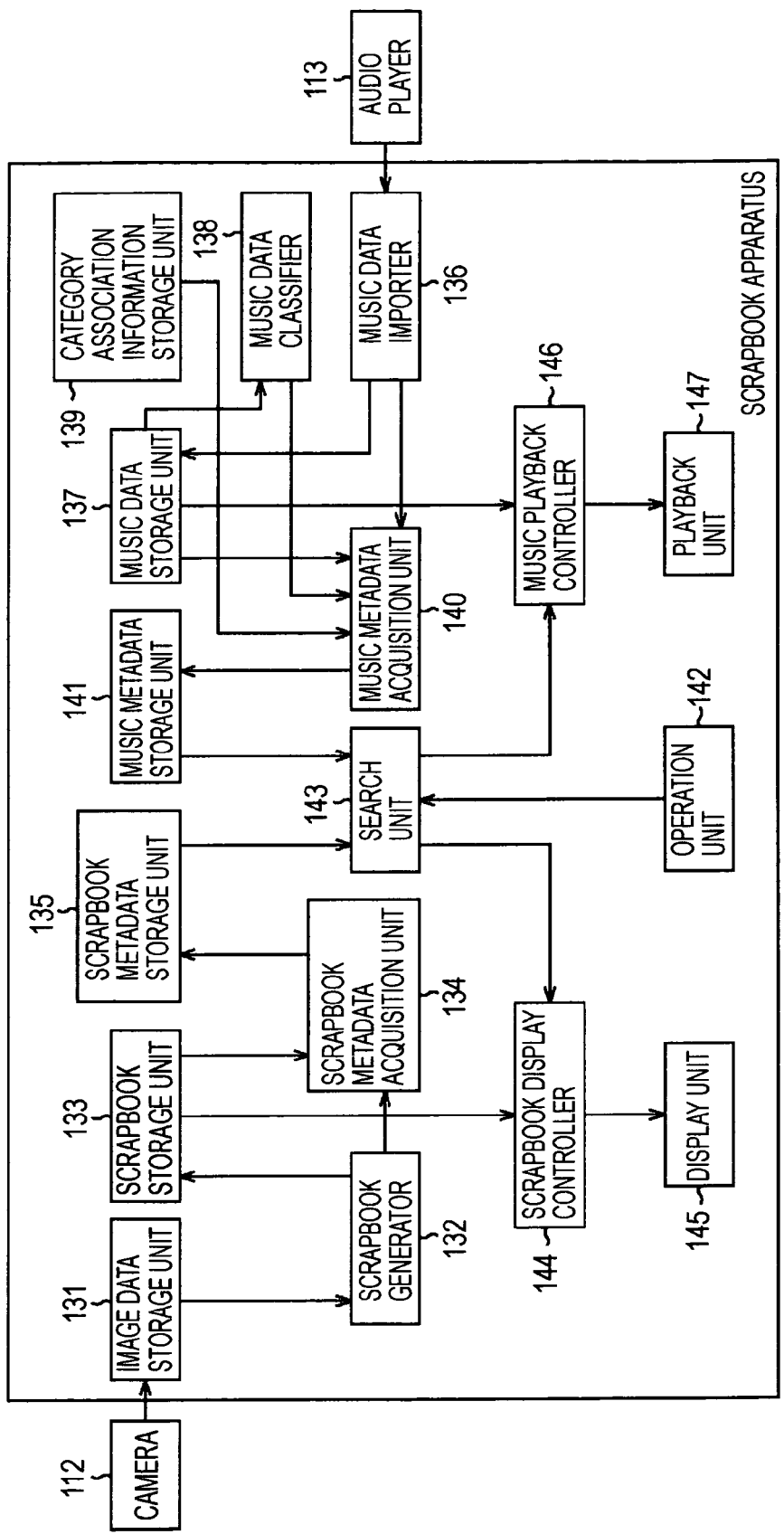
FIG. 2 is a block diagram illustrating an exemplary functional configuration of a scrapbook apparatus.

FIG. 2 illustrates an exemplary configuration of a scrapbook apparatus functionally realized as a result of the CPU 101 executing a scrapbook program.

More specifically, using the PC shown in FIG. 1, the user may cause the scrapbook program to be executed by operating the input unit 106 or by connecting the camera 112 or the audio player 113 to the input/output I/F 109 (see FIG. 1). In so doing, the CPU 101 executes the scrapbook program stored in the HD 104, and as a result, the PC subsequently functions as the scrapbook apparatus shown in FIG. 2.

The scrapbook apparatus in FIG. 2 is provided with an image data storage unit 131, a scrapbook generator 132, a scrapbook storage unit 133, a scrapbook metadata acquisition unit 134, a scrapbook metadata storage unit 135, a music data importer 136, a music data storage unit 137, a music data classifier 138, a category association information storage unit 139, a music metadata acquisition unit 140, a music metadata storage unit 141, an operation unit 142, a search unit 143, a scrapbook display controller 144, a display unit 145, a music playback controller 146, and a playback unit 147.

The image data storage unit 131 stores content (in the present case, photo data) that has been imported to the scrapbook apparatus (i.e., the PC) from the camera 112.

The camera 112 herein conducts imaging according to user operations, and then stores the photo data obtained as a result of such imaging in internal or removable memory. In addition, the camera 112 also stores various additional information in the internal or other memory as Exchangeable image file format (Exif) information associated with the photo data. For example, the additional information may include the shooting date and time at which the photo data was acquired (including values for the year, month, day, hour, minute, and second, for example), the shooting location, or configuration settings such as the focal length, aperture, and shutter speed at the time of shooting. Furthermore, the camera 112 is also able to externally output (i.e., transmit) the above information, and may for example output a set of photo data and Exif information stored in the internal or other memory as a single file.

In the scrapbook apparatus, such photo data and Exif information is imported from the camera 112 and stored in the image data storage unit 131.

The scrapbook generator 132 then generates a scrapbook wherein a plurality of photo data stored in the image data storage unit 131 is grouped according to the shooting date and time specified in Exif information, and then pasted (i.e., arranged) on the respective pages of the scrapbook. The generated scrapbook is then supplied to the scrapbook storage unit 133.

Herein, the scrapbook generator 132 also associates the scrapbook with a scrapbook ID, the scrapbook ID being identification information (such as a filename, for example) that specifies the associated scrapbook. When displaying a scrapbook, the particular scrapbook specified by the scrapbook ID associated thereto is read from the scrapbook storage unit 133 and then displayed.

In addition, the scrapbook generated by the scrapbook generator 132 contains the photo data that was arranged on the respective pages thereof. More specifically, the scrapbook generator 132 associates one or more photo IDs with respective pages of the scrapbook, the photo IDs being identification information (such as filenames, for example) that specify the photo data arranged on a given page. When displaying a scrapbook, the particular photo data specified by the one or more photo IDs associated with the respective pages is read from the image data storage unit 131 and then displayed.

The scrapbook storage unit 133 stores the scrapbook supplied by the scrapbook generator 132.

The scrapbook metadata acquisition unit 134 acquires scrapbook metadata (being the metadata of the scrapbook generated by the scrapbook generator 132), and then supplies the acquired scrapbook metadata to the scrapbook metadata storage unit 135.

More specifically, the scrapbook metadata acquisition unit 134 acquires the Exif information corresponding to the photo data arranged on the respective pages of the scrapbook by the scrapbook generator 132, associates photo IDs thereto, and then supplies the resulting information to the scrapbook metadata storage unit 135 as scrapbook metadata (hereinafter, also referred to as arranged photo metadata).

At this point, the scrapbook metadata acquisition unit 134 may also acquire user input information (such as comments or other information with respect to the photo data, for example) that is input as a result of the user operating the input unit 106. Such user input information is then appended to the arranged photo metadata. In other words, the arranged photo metadata contains at least a photo ID, Exif information, and user input information.

In addition, the scrapbook metadata acquisition unit 134 acquires the photo IDs of the photo data arranged on the respective pages of the scrapbook by the scrapbook generator 132, associates a scrapbook ID thereto, and then supplies the acquired photo IDs to the scrapbook metadata storage unit 135 as scrapbook metadata (hereinafter, also referred to as primary metadata).

At this point, the scrapbook metadata acquisition unit 134 may also acquire user input information that is input as a result of the user operating the input unit 106. Such user input information may include, for example, the scrapbook title, the overall mood of the scrapbook (such as "fun", "tranquil", or "solemn"), or the time period during which the photo data arranged on the respective pages of the scrapbook was acquired. The user input information is then appended to the primary metadata. In other words, the primary metadata contains at least a scrapbook ID, a photo ID, and user input information.

Hereinafter, the primary metadata and the photo arrangement photo metadata will be collectively referred to as scrapbook metadata.

The scrapbook metadata storage unit 135 stores the scrapbook metadata (i.e., the primary metadata and the arranged photo metadata) supplied by the scrapbook metadata acquisition unit 134.

The music data importer 136 imports music data from an audio player 113 connected to the PC that functions as the scrapbook apparatus, and subsequently supplies the imported music data to the music data storage unit 137.

The audio player 113 herein stores music data in internal or removable memory, while also playing back music data according to user operations. In addition, the audio player 113 also stores, in the internal or other memory, additional information that is appended to the music data. Such additional information may include the title, artist name, and release date (such as the year, month, and day) of the music (i.e., the song) corresponding to the music data, as well as a playback history indicating when the music data was previously played back by the audio player 113. Furthermore, the audio player 113 is also able to externally output (i.e., transmit) the above information, and may for example output a set of music data and corresponding additional information stored in the internal or other memory as a single file.

In the scrapbook apparatus, music data and corresponding additional information is imported from the audio player 113 by the music data importer 136 and subsequently stored in the music data storage unit 137.

At this point, the music data importer 136 associates one or more music IDs with the music data, the music IDs being identification information (such as filenames, for example) that specify the music data. When playing back music data, the particular music data specified by the music ID associated thereto is read from the music data storage unit 137 and then played back.

The music data storage unit 137 stores the music data and the corresponding additional information supplied by the music data importer 136.

The music data classifier 138 acquires music data from the music data storage unit 137 and then analyzes the characteristics of the music data. Subsequently, on the basis of the results of the analysis of the music data characteristics, the music data classifier 138 classifies the music data according to one or more categories from among a plurality of categories. The music data classifier 138 then supplies category information indicating the one or more categories to the music metadata acquisition unit 140.

As a more specific example, the music data classifier 138 may conduct the following. When music data is stored in the music data storage unit 137, the music data classifier 138 acquires the music data from the music data storage unit 137, and then separates the audio signal represented by the music data into eight octaves. In addition, for each of the eight octaves, the music data classifier 138 extracts a 12-pitch audio signal and analyzes the musical characteristics thereof, such as the melody, chord progression, tempo, and number of notes in each signal.

In addition, on the basis of the characteristics of the music data obtained as a result of the above analysis, the music data classifier 138 classifies the music data according to one or more categories corresponding to the obtained characteristics. For example, the music data may be classified according to categories such as "upbeat music", "soft music", or "majestic music". The music data classifier 138 then supplies category information indicating the one or more categories to the music metadata acquisition unit 140.

The category association information storage unit 139 stores category association information for associating the one or more categories by which the music data classifier 138 classified the music data with the scrapbook metadata stored in the scrapbook metadata storage unit 135.

For example, the category association information may be information indicating the mood of the one or more categories by which the music data is classified (and thus also indicating the mood of the music data by extension). Such category association information may then be associated with the overall mood (as specified by the user input information) of the scrapbook corresponding to the scrapbook metadata stored in the scrapbook metadata storage unit 135.

More specifically, the category association information storage unit 139 may store category association information indicating that the "fun" mood is associated with the "upbeat music" category, indicating that the "tranquil" mood is associated with the "soft music" category, or indicating that the "solemn" mood is associated with the "majestic music" category.

The music metadata acquisition unit 140 acquires music metadata (being the metadata of the music data imported by the music data importer 136), and subsequently supplies the acquired music metadata to the music metadata storage unit 141.

More specifically, the music metadata acquisition unit 140 acquires the additional information that has been appended to the music data stored in the music data storage unit 137, while also acquiring category association information from the category association information storage unit 139 that is associated with the category information supplied from the music data classifier 138. The music metadata acquisition unit 140 then associates a music ID to the acquired information, and then supplies the result to the music metadata storage unit 141 as the metadata of the music data (to be hereinafter referred to as music metadata).

In other words, the music metadata contains at least a music ID, additional information, and category association information.

The music metadata acquisition unit 140 may also acquire user input information that is input as a result of the user operating the input unit 106, and then append the acquired user input information to the music metadata.

The music metadata storage unit 141 then stores the music metadata supplied from the music metadata acquisition unit 140.

The operation unit 142 is operated by the user and then supplies an operation signal to the search unit 143 in accordance with the user operations. More specifically, the operation unit 142 supplies to the search unit 143 an operation signal corresponding to a user-conducted operation for issuing a command to display a scrapbook.

In accordance with the operation signal from the operation unit 142, the search unit 143 searches for music metadata that is related to the scrapbook metadata for the scrapbook specified for display. The search unit 143 then supplies information to the scrapbook display controller 144 causing the scrapbook specified for display to be displayed, while also supplying information to the music playback controller 146 causing playback of the music data corresponding to the music metadata related to the scrapbook specified for display.

More specifically, in accordance with the operation signal from the operation unit 142, the search unit 143 acquires from the scrapbook metadata storage unit 135 the primary metadata that is associated with the scrapbook ID of the scrapbook specified for display, as well as the arranged photo metadata that is associated with the one or more photo IDs contained in the primary metadata.

The search unit 143 then searches the music metadata storage unit 141 for music metadata containing information that is similar or identical to the information contained in the primary metadata and the arranged photo metadata that was acquired from the scrapbook metadata storage unit 135.

For example, the search unit 143 may search the music metadata storage unit 141 for music metadata containing a "Release Date" or "Playback History" value in the additional information that is chronologically close to the period during which the photo data arranged on the respective pages of the scrapbook was acquired, such period information being contained in the primary metadata acquired from the scrapbook metadata storage unit 135. The search unit 143 may similarly search for music metadata containing additional information that is chronologically close to the "Shooting Date/Time" value in the Exif information contained in the arranged photo metadata.

When the search result returns music metadata containing information that is similar or identical to the information contained in the primary metadata and the arranged photo metadata acquired from the scrapbook metadata storage unit 135, the search unit 143 supplies information to the scrapbook display controller 144 that causes display of the scrapbook specified by the scrapbook ID contained in the primary metadata that was acquired from the scrapbook metadata storage unit 135. In addition, the search unit 143 supplies information to the music playback controller 146 that causes playback of the music data specified by the one or more music IDs contained in the music metadata that was found by search.

If the search result does not return any music metadata containing information that is similar or identical to the information contained in the primary metadata and the arranged photo metadata that was acquired from the scrapbook metadata storage unit 135, then the search unit 143 supplies information to the scrapbook display controller 144 that causes display of the scrapbook specified by the scrapbook ID contained in the primary metadata that was acquired from the scrapbook metadata storage unit 135.

In accordance with the information from the 143 that causes display of the scrapbook, the scrapbook display controller 144 reads the corresponding scrapbook stored in the scrapbook storage unit 133, and then conducts a control causing the display unit 145 to display thumbnails or pages of the scrapbook.

Following the control by the scrapbook display controller 144, the display unit 145 then displays thumbnails or pages of the scrapbook.

In accordance with the information from the search unit 143 that causes playback of the music data, the music playback controller 146 reads the corresponding music data stored in the music metadata storage unit 141, and then conducts a control causing the playback unit 147 to play back the music data.

Following the control by the music playback controller 146, the playback unit 147 then plays back the music data.

In FIG. 2, the image data storage unit 131, the scrapbook storage unit 133, the scrapbook metadata storage unit 135, the music data storage unit 137, the category association information storage unit 139, and the music metadata storage unit 141 correspond to the HD 104 or the RAM 103 shown in FIG. 1. In addition, the scrapbook generator 132, the scrapbook metadata acquisition unit 134, the music data importer 136, the music data classifier 138, the music metadata acquisition unit 140, the search unit 143, the scrapbook display controller 144, and the music playback controller 146 correspond to the CPU 101 shown in FIG. 1 or a similar component, while the operation unit 142 corresponds to the input unit 106 shown in FIG. 1. The display unit 145 and the playback unit 147 correspond to the output unit 105 shown in FIG. 1.

In a scrapbook apparatus configured as described above, various processing is conducted, including: scrapbook generation processing for generating a scrapbook wherein photo data stored in the image data storage unit 131 is arranged on the respective pages thereof; music data import processing for importing music data from the audio player 113; scrapbook metadata acquisition processing for acquiring scrapbook metadata for the scrapbook generated by the scrapbook generator 132; music metadata acquisition processing for acquiring music metadata for the music data stored in the music data storage unit 137; and scrapbook display control processing for causing the display unit 145 to display a scrapbook stored in the scrapbook storage unit 133.

FIG. 3 shows an example of the arranged photo metadata that is acquired by the scrapbook metadata acquisition unit 134 and then stored in the scrapbook metadata storage unit 135 as a result of the scrapbook metadata acquisition processing.

The arranged photo metadata contains values for fields such as ID, Shooting Date/Time, Comment, and Focal Length.

The ID value is a photo ID specifying photo data arranged on a respective page of a scrapbook. The ID value is set by the scrapbook generator 132 and subsequently acquired by the scrapbook metadata acquisition unit 134. In the example shown in FIG. 3, the ID value is "P1".

The Shooting Date/Time value is a shooting date and time indicating when the photo data was acquired by the camera 112. The Shooting Date/Time value is part of the Exif information that is acquired by the scrapbook metadata acquisition unit 134. In the example shown in FIG. 3, the Shooting Date/Time value is "15 AUGUST 11:15", thereby indicating that the photo data was acquired on the date August 15 at the time 11:15.

The Comment value is a comment corresponding to the photo data, being user input information that is input as a result of the user operating the input unit 106. The Comment value is then acquired by the scrapbook metadata acquisition unit 134. In the example shown in FIG. 3, the Comment value is "AT THE BEACH".

The Focal Length value is a focal length, being a setting in the camera 112 that was configured at the time the photo data was acquired. The Focal Length value is part of the Exif information that is acquired by the scrapbook metadata acquisition unit 134.

In addition, the arranged photo metadata may also include other values contained in the Exif information that is acquired by the scrapbook metadata acquisition unit 134, such as values for shooting location, aperture, and shutter speed, for example.

FIG. 4 shows an example of the primary metadata that is acquired by the scrapbook metadata acquisition unit 134 and then stored in the scrapbook metadata storage unit 135 as a result of the scrapbook metadata acquisition processing.

The primary metadata contains values for the ID, Title, Mood, Period, and Photo ID fields.

The ID value is a scrapbook ID specifying a scrapbook. The ID value is set by the scrapbook generator 132 and subsequently acquired by the scrapbook metadata acquisition unit 134. In the example shown in FIG. 4, the ID value is "S1".

The Title value is a title for the scrapbook, being user input information that is input as a result of the user operating the input unit 106. The Title value is then acquired by the scrapbook metadata acquisition unit 134. In the example shown in FIG. 4, the Title value is "IZU TRIP".

The Mood value is a mood for the photo data arranged on the respective pages of the scrapbook, being user input information that is input as a result of the user operating the input unit 106. The Mood value is then acquired by the scrapbook metadata acquisition unit 134. In the example shown in FIG. 4, the Mood value is "FUN".

The Period value is the period during which the photo data arranged on the respective pages of the scrapbook was acquired, being user input information that is input as a result of the user operating the input unit 106. The Period value is then acquired by the scrapbook metadata acquisition unit 134. In the example shown in FIG. 4, the Period value is expressed in units of days as "AUGUST 15-17", indicating that the photo data was acquired during the period from August 15 through August 17.

The Photo ID value is one or more photo IDs for photo data that is arranged on the respective pages of the scrapbook specified by the ID value (i.e., the scrapbook ID). The Photo ID value is then acquired by the scrapbook metadata acquisition unit 134. In the example shown in FIG. 4, the Photo ID value is "P1, P2, . . . ".

In other words, the scrapbook having the scrapbook ID "S1" has arranged therein photo data, including the photo having the photo ID "P1" and the photo data having the photo ID "P2".

FIG. 5 shows an example of the music metadata that is acquired by the music metadata acquisition unit 140 and then stored in the music metadata storage unit 141 as a result of the music metadata acquisition processing.

The music metadata contains values for the ID, Title, Artist, Release Date, Playback History, and Mood fields.

The ID value is a music ID specifying particular music data. The ID value is set by the music data importer 136 and subsequently acquired by the music metadata acquisition unit 140. In the example shown in FIG. 5, the ID value is "M1".

The Title value is the title of the music (i.e., the song) corresponding to the music data, and is part of the additional information acquired by the music metadata acquisition unit 140. In the example shown in FIG. 5, the Title value is "ABC".

The Artist value is the name of the artist of the music (i.e., the song) corresponding to the music data, and is part of the additional information acquired by the music metadata acquisition unit 140. In the example shown in FIG. 5, the Artist value is "AAA".

The Release Date value is the date when the music (i.e., the song) corresponding to the music data was released for sale (or alternatively, when distribution of the music over a network or similar means was initiated). The Release Date value is part of the additional information acquired by the music metadata acquisition unit 140. In the example shown in FIG. 5, the Release Date value is "08/01/2006", indicating that the music was released for sale on Aug. 1, 2006.

The Playback History value is the most recent date and time when the music (i.e., the song) corresponding to the music data was played back by the user by means of the audio player 113. The Playback History value is part of the additional information that is acquired by the music metadata acquisition unit 140. In the example shown in FIG. 5, the Playback History value is "08/17/2006 14:25", indicating that the most recent playback occurred on the date Aug. 17, 2006 at the time 14:25.

The Mood value is category association information that indicates the mood of the music data (or more specifically, the category of the music data). The Mood value is set by the music data classifier 138 and subsequently acquired by the music metadata acquisition unit 140. In the example shown in FIG. 5, the Mood value is "FUN".

Thus, when the user performs an operation to issue a command for displaying the scrapbook having the scrapbook ID "S1" as shown in FIG. 4, the search unit 143 searches for music metadata containing information that is similar (i.e., approximates) or identical to information contained in the arranged photo metadata shown in FIG. 3 and the primary metadata shown in FIG. 4.

As a more specific example, the search unit 143 may search for music metadata containing a Release Date value or a Playback History value from August 15 through August 17, the date range expressed by the Period value "AUGUST 15-17" contained in the primary metadata shown in FIG. 4. In other words, the search unit 143 may search for music metadata using a search parameter stipulating that either the Release Date value or the Playback History value be from August 15 through August 17.

The Playback History value "08/17/2006 14:25" in the music metadata shown in FIG. 5 indicates a time existing in the range from August 15 through August 17, the date range expressed by the Period value "AUGUST 15-17" contained in the primary metadata shown in FIG. 4, and consequently the music metadata shown in FIG. 5 matches the above search parameter. For this reason, the search unit 143 supplies information to the scrapbook display controller 144 that causes the scrapbook specified by the scrapbook ID "P1" in the primary metadata to be displayed, while also supplying information to the music playback controller 146 that causes the music data specified by the music ID "M1" to be played back.

In the case where the search result returns a plurality of music metadata containing either a Release Date value or a Playback History value existing within the time range expressed by the Period value in the primary metadata, the search unit 143 may, for example, randomly select a set of music metadata corresponding to a single song for playback from among the plurality of music data corresponding to the plurality of music metadata. Subsequently, when playback of the music data corresponding to the selected music metadata is complete, the search unit 143 may then repeat the above operation and select another set of music metadata corresponding to a single song for playback from among the plurality of music data corresponding to the plurality of music metadata that was found by search. Alternatively, the search unit 143 may select music metadata in sequence such that the corresponding music data is played back in order of the earliest (or the latest) Release Date value or Playback History value contained in the plurality of music metadata that was found by search.

In the case where the search result does not return any music metadata containing either a Release Date value or a Playback History value existing within the time range expressed by the Period value in the primary metadata, the search unit 143 may apply a margin to the time range expressed by the Period value in the primary metadata. For example, the margin may be several days or a week applied before and after the expressed time range, or the period between the first and last days of the month specified by the expressed time range. After applying such a margin, the search unit 143 then conducts another search for music metadata containing a Release Date value or a Playback History value existing within the new time range.

In addition, the search unit 143 may also, for example, search for music metadata containing information indicating a mood that is identical to (or synonymous with) the Mood value "FUN" that is contained in the primary metadata shown in FIG. 4. In other words, the search unit 143 may search for music metadata using a search parameter stipulating that such mood information expresses a "fun" mood.

The Mood value "FUN" in the music metadata shown in FIG. 5 is identical to the Mood value "FUN" contained in the primary metadata shown in FIG. 4, and consequently the music metadata shown in FIG. 5 matches the above search parameter. For this reason, the search unit 143 supplies information to the scrapbook display controller 144 that causes the scrapbook specified by the scrapbook ID "P1" in the primary metadata to be displayed, while also supplying information to the music playback controller 146 that causes the music data specified by the music ID "M1" to be played back.

In the foregoing explanation, the search unit 143 is described as searching for music metadata containing information indicating a mood that is identical to (or synonymous with) the Mood value "FUN" contained in the primary metadata shown in FIG. 4. Thus, it should be appreciated that the search unit 143 may also search for music metadata containing information indicating a mood that is a synonym of the Mood value "FUN" contained in the primary metadata shown in FIG. 4 (such as "PLEASANT", for example).

Furthermore, the search unit 143 may also, for example, search for music metadata containing a Playback History value indicating a time that is within one hour before or after 11:15 on August 15, the date and time expressed by the Shooting Date/Time value "AUGUST 15 11:15" contained in the arranged photo metadata shown in FIG. 3. The search unit 143 may also, for example, search for music metadata containing a Title value that is synonymous with either the Comment value "AT THE BEACH" contained in the arranged photo metadata shown in FIG. 3, or with the Title value "IZU TRIP" contained in the primary metadata shown in FIG. 4.

It should also be appreciated that the arranged photo metadata, the primary metadata, and the music metadata are not limited to the configurations described above, and may contain additional information.

Figure 6:
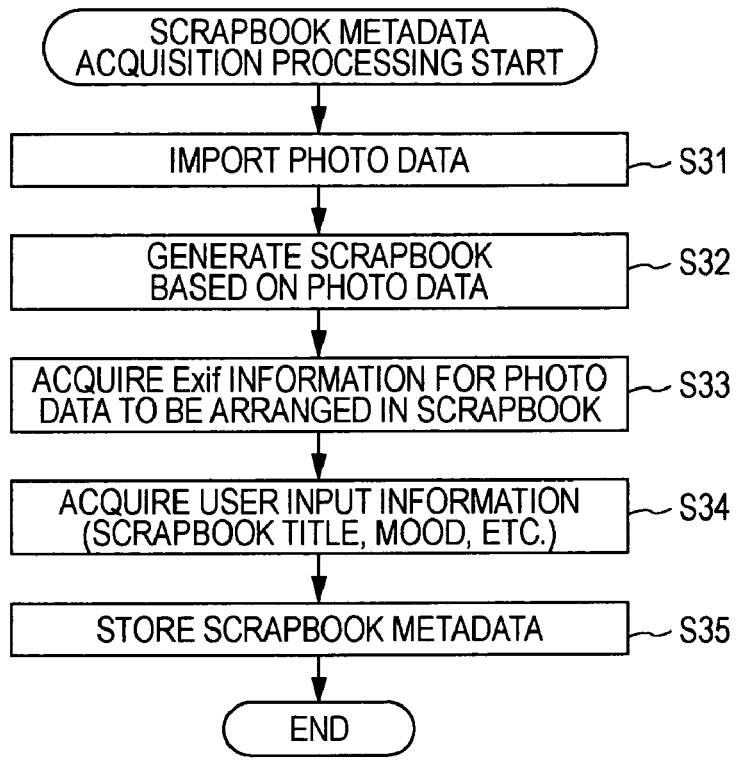
FIG. 6 is a flowchart explaining scrapbook metadata acquisition processing.

Scrapbook metadata acquisition processing that is conducted by the scrapbook apparatus shown in FIG. 2 will now be described with reference to the flowchart shown in FIG. 6.

Scrapbook metadata acquisition processing is initiated when, for example, the camera 112 is connected to the input/output I/F 109 (see FIG. 1).

In the scrapbook metadata acquisition process, the photo data and the Exif information is imported from the camera 112 to the PC that acts as the scrapbook apparatus. In step S31, the image data storage unit 131 stores the imported photo data and Exif information, and then the process proceeds to step S32.

In step S32, the scrapbook generator 132 generates a scrapbook wherein the photo data stored in the image data storage unit 131 is arranged on the respective pages of the scrapbook according to the Exif information stored in the image data storage unit 131. The scrapbook generator 132 then supplies the generated scrapbook to the scrapbook storage unit 133, and then the process proceeds to step S33.

In step S33, the scrapbook metadata acquisition unit 134 acquires the Exif information of the photo data that was arranged on the respective pages of the scrapbook by the scrapbook generator 132. In addition, if the user operates the input unit 106 to input one or more comments with respect to the photo data as user input information, then the scrapbook metadata acquisition unit 134 also acquires such comments.

Subsequently, the scrapbook metadata acquisition unit 134 associates the Exif information and/or comments of the photo data with one or more photo IDs, constructs arranged photo metadata therefrom, and then supplies the result to the scrapbook metadata storage unit 135. The process then proceeds from step S33 to step S34.

In step S34, the scrapbook metadata acquisition unit 134 acquires the one or more photo IDs for the photo data that was arranged on the respective pages of the scrapbook by the scrapbook generator 132. In addition, the scrapbook metadata acquisition unit 134 acquires user input information that has been input as a result of the user operating the input unit 106, such as the scrapbook title, the overall mood of the scrapbook, and the time period during which the photo data arranged on the respective pages of the scrapbook was acquired. Subsequently, the scrapbook metadata acquisition unit 134 associates the title, mood, period, and one or more photo IDs of the photo data with a scrapbook ID, constructs primary metadata therefrom, and then supplies the result to the scrapbook metadata storage unit 135. The process then proceeds from step S34 to step S35.

In step S35, the scrapbook metadata storage unit 135 stores the primary metadata and the arranged photo metadata that was supplied from the scrapbook metadata acquisition unit 134 as scrapbook metadata. Scrapbook metadata acquisition processing is then terminated.

Herein, in steps S33 and s34, the scrapbook metadata acquisition unit 134 is configured to acquire the Exif information and one or more photo IDs for the photo data from the scrapbook generator 132. However, the scrapbook metadata acquisition unit 134 may also be configured to acquire the Exif information and one or more photo IDs for the photo data arranged in a scrapbook stored in the scrapbook storage unit 133 from the scrapbook storage unit 133 itself.

Figure 7:
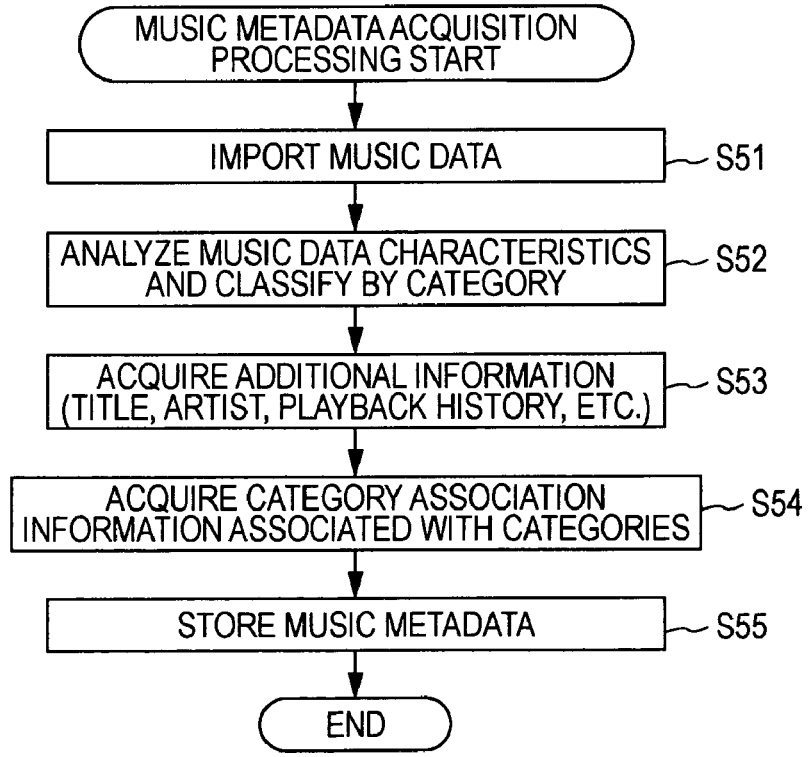
FIG. 7 is a flowchart explaining music metadata acquisition processing.

Music metadata acquisition processing that is conducted by the scrapbook apparatus shown in FIG. 2 will now be described with reference to the flowchart shown in FIG. 7.

Music metadata acquisition processing is initiated when, for example, the audio player 113 is connected to the input/output I/F 109 (see FIG. 1).

In step S51 of the music metadata acquisition process, the music data importer 136 imports music data and additional information from the audio player 113, and then supplies the imported music data and additional information to the music data storage unit 137. The music data storage unit 137 stores the music data and the additional information, and then the process proceeds to step S52.

In step S52, the music data classifier 138 acquires the music data from the music data storage unit 137 and analyzes the characteristics of the music data. Subsequently, on the basis of the results of the analysis of the music data, the music data classifier 138 classifies the music data according to one or more categories from among a plurality of categories. The music data classifier 138 then supplies category information indicating the one or more categories to the music metadata acquisition unit 140. The process then proceeds to step S53.

In step S53, the music metadata acquisition unit 140 acquires the title, artist name, and playback history in the additional information corresponding to the music data that was imported from the audio player 113 and stored in the music data storage unit 137 in step S51. The process then proceeds to step S54.

In step S54, the music metadata acquisition unit 140 acquires category association information from the category association information storage unit 139 that is associated with the category information that was supplied by the music data classifier 138 in step S52. The process then proceeds to step S55.

In step S55, the music metadata acquisition unit 140 associates the additional information and the category association information with one or more music IDs, constructs music metadata therefrom, and then supplies the result to the music metadata storage unit 141. Subsequently, the music metadata storage unit 141 stores the music metadata supplied by the music metadata acquisition unit 140. Music metadata acquisition processing is then terminated.

Herein, in step S53, the music metadata acquisition unit 140 is configured to acquire the additional information corresponding to the music data stored in the music data storage unit 137 from the music data storage unit 137 itself. However, the music metadata acquisition unit 140 may also be configured to acquire the additional information corresponding to the music data imported from the audio player 113 by the music data importer 136 from the music data importer 136.

In addition, in the music metadata acquisition process, the music data importer 136 may also be configured to import from the audio player 113 only the playback history for music data already stored in the music data storage unit 137.

Scrapbook display control processing that is conducted by the scrapbook apparatus shown in FIG. 2 will now be described with reference to the flowchart shown in FIG. 8.

In step S71 of the scrapbook display control process, the operation unit 142 determines whether or not an operation to issue a scrapbook display command has been performed by the user.

If it is determined in step S71 that an operation to issue a scrapbook display command has not been performed, then the processing in step S71 is repeated until it is determined that an operation to issue a scrapbook display command has been performed.

If it is determined in step S71 that an operation to issue a scrapbook display command has been performed, then the operation unit 142 supplies to the search unit 143 an operation signal corresponding to the operation to issue a scrapbook display command. The process then proceeds to step S72.

In step S72, in accordance with the operation signal from the operation unit 142, the search unit 143 searches for music metadata related to the scrapbook metadata of the scrapbook specified for display. The process then proceeds to step s73.

In step S73, the search unit 143 determines whether or not the search result returned music metadata relating to the scrapbook metadata of the scrapbook specified for display.

If it is determined in step S73 that the search result returned music metadata relating to the scrapbook metadata of the scrapbook specified for display, then the search unit 143 supplies information to the scrapbook display controller 144 causing the scrapbook specified for display to be displayed, while also supplying information to the music playback controller 146 causing playback of the music data corresponding to the music metadata that is related to the scrapbook specified for display. The process then proceeds to step S74.

In step S74, the scrapbook display controller 144 operates in accordance with the information from the search unit 143 that causes scrapbook display, reads the corresponding scrapbook stored in the scrapbook storage unit 133, and then causes the pages of the scrapbook to be displayed by the display unit 145. In addition, in parallel with the scrapbook display, the scrapbook display controller 144 operates in accordance with the information from the search unit 143 that causes music data playback, reads the corresponding music data stored in the music metadata storage unit 141, and then causes the playback unit 147 to play back the music data. Scrapbook display control processing is then terminated.

On the other hand, if it is determined in step S73 that the search result did not return any music metadata relating to the scrapbook metadata of the scrapbook specified for display, then the search unit 143 supplies information to the scrapbook display controller 144 causing the scrapbook specified for display to be displayed. The process then proceeds to step S75.

In step S75, the scrapbook display controller 144 operates in accordance with the information from the search unit 143 that causes scrapbook display, reads the corresponding scrapbook stored in the scrapbook storage unit 133, and then causes the pages of the scrapbook to be displayed by the display unit 145. Scrapbook display control processing is then terminated.

As a result of the scrapbook display control processing, a scrapbook specified for display by the user is displayed, while in addition, a search is conducted to find music metadata related to the scrapbook metadata of the specified scrapbook, and the music data corresponding to such music metadata is then played back. As a result, BGM is applied to the scrapbook being displayed by the display unit 145 that is reminiscent of the time when the photo data arranged in the scrapbook was acquired, the BGM being songs that the user was listening to when acquiring the photo data, or songs expressing the mood of the time or the place where the photo data was acquired, for example.

As described in the foregoing, the scrapbook apparatus is configured such that when a command is issued to display a scrapbook (i.e., a collection of a plurality of photo data), a search is conducted to find music metadata related to the scrapbook metadata (being the metadata of the scrapbook, or in other words, metadata with respect to the plurality of photo data). A control is then conducted to display the scrapbook specified for display. In addition, in parallel with the display of the scrapbook, another control is conducted to play back the music data corresponding to the music metadata that was found by search. In so doing, BGM is applied to a collection of content such as photo data, wherein the BGM is reminiscent of the time when the photo data was acquired.

In other words, while viewing a scrapbook, the user is able to listen to BGM that is reminiscent of the time when the photo data arranged in the scrapbook was acquired.

In the present embodiment, BGM is applied to a collection of photo data acquired by a digital camera. However, it should be appreciated that it is also possible to apply BGM to other content. For example, BGM may be applied to video content, such as landscapes or other footage acquired by a video camera.

More specifically, respective thumbnail images for a plurality of videos acquired by a video camera may be arranged in a scrapbook, for example, such that when the user performs an operation to select one or more thumbnail images therefrom, the corresponding videos are played back. The scrapbook apparatus may then apply BGM to the corresponding videos.

While the foregoing describes the case wherein the present invention is applied to a PC, it should be appreciated that, in addition to PCs, the present invention is also applicable to devices having functions for displaying a collection of plural image data and playing back music (i.e., audio). For example, the present invention may be applied to a device such as a hard disk recorder or a digital camera.

Processing steps defined in a program that causes a computer to execute various processes may be executed in a time series following the order described in the accompanying flowcharts. However, the present specification also encompasses cases wherein such processing steps are executed individually or in parallel (by means of object-based processing or parallel processing, for example).

In addition, the program may be processed by a single computer, or processed in a distributed manner by a plurality of computers.

It should be appreciated that embodiments of the present invention are not limited to the foregoing, and that various modifications are also possible without departing from the scope and spirit of the present invention.

What is claimed is:

1. An information processing apparatus that displays image data and plays back music data, comprising:
   searching means for searching for music metadata (being the metadata of the music data) that is related to image metadata (being the metadata of a plurality of image data), such searching being conducted when a command to display a plurality of image data is issued, the music metadata being generated by separating the music data into octaves and for each octave extracting a twelve pitch audio signal and analyzing the melody of the extracted signal, the chord progression of the extracted signal, the tempo of the extracted signal, or the number of notes of the extracted signal;
   display control means for controlling the display of the plurality of image data specified for display; and
   playback control means for controlling the playback of the music data corresponding to the music metadata found by the searching means, the playback being controlled in parallel with the display of the plurality of image data by the display control means.

2. The information processing apparatus according to claim 1, wherein
   the music metadata is configured to include a playback history indicating when the music data was played back by a music playback apparatus, and
   the searching means searches for music metadata containing a playback history that is chronologically close to a shooting date and time contained in the image metadata that indicates the time at which the plurality of image data was acquired by an imaging apparatus.

3. The information processing apparatus according to claim 2, further comprising:
   importing means for importing the playback history in the music metadata from the music playback apparatus.

4. The information processing apparatus according to claim 1, wherein
   the music metadata is configured to include the release date of the music data, and
   the searching means searches for music metadata containing a release date that is chronologically close to the shooting date and time contained in the image metadata that indicates the time at which the plurality of image data was acquired by an imaging apparatus.

5. The information processing apparatus according to claim 1, further comprising:
   classifying means for analyzing the characteristics of the music data and then classifying the music data into given categories; and
   association information storing means for storing category association information that associates image metadata with one or more categories;
   wherein
   the music metadata is configured to include the category association information, and
   the searching means searches for music metadata containing category association information that is associated with the image metadata.

6. The information processing apparatus according to claim 5, further comprising:
   input means for inputting a mood for a plurality of image data as one value contained in the image metadata, the mood value being input according to operations by the user;
   wherein
   the association information storing means stores category association information expressing the mood of the one or more categories whereby the music data is classified, and
   the searching means searches for music metadata containing category association information expressing a mood that is similar or identical to the mood of the plurality of image data.

7. An information processing method for an information processing apparatus that displays image data and plays back music data, the method comprising the steps of:
   searching for music metadata (being the metadata of the music data) that is related to image metadata (being the metadata of a plurality of image data), such searching being conducted when a command to display a plurality of image data is issued, the music metadata being generated by separating the music data into octaves and for each octave extracting a twelve pitch audio signal and analyzing the melody of the extracted signal, the chord progression of the extracted signal, the tempo of the extracted signal, or the number of notes of the extracted signal;
   controlling the display of the plurality of image data specified for display; and
   controlling the playback of the music data corresponding to the music metadata found by search, the playback being controlled in parallel with the display of the plurality of image data.

8. A computer-readable medium storing a computer-executable program that causes a computer to function as an information processing apparatus that displays image data and plays back music data, the program causing the computer to function so as to comprise:
   searching means for searching for music metadata (being the metadata of the music data) that is related to image metadata (being the metadata of a plurality of image data), such searching being conducted when a command to display a plurality of image data is issued, the music metadata being generated by separating the music data into octaves and for each octave extracting a twelve pitch audio signal and analyzing the melody of the extracted signal, the chord progression of the extracted signal, the tempo of the extracted signal, or the number of notes of the extracted signal;
   display control means for controlling the display of the plurality of image data specified for display; and
   playback control means for controlling the playback of the music data corresponding to the music metadata found by the searching means, the playback being controlled in parallel with the display of the plurality of image data by the display control means.

9. An information processing apparatus that displays image data and plays back music data, comprising:
   a search unit configured to search for music metadata (being the metadata of the music data) that is related to image metadata (being the metadata of a plurality of image data), such searching being conducted when a command to display a plurality of image data is issued, the music metadata being generated by separating the music data into octaves and for each octave extracting a twelve pitch audio signal and analyzing the melody of the extracted signal, the chord progression of the extracted signal, the tempo of the extracted signal, or the number of notes of the extracted signal;

a display controller configured to control the display of the plurality of image data specified for display; and a playback controller configured to control the playback of the music data corresponding to the music metadata found by the search unit, the playback being controlled in parallel with the display of the plurality of image data by the display controller.

* * * * *